United States Patent [19]

Ghazarian et al.

[11] Patent Number: 5,801,616
[45] Date of Patent: Sep. 1, 1998

[54] VOICE ACTUATED VEHICLE SECURITY SYSTEM WITH STARTING SYSTEM INTERLOCK AND AUTOMATIC ARMING FEATURE

[75] Inventors: John Ghazarian, Reseda, Calif.; George Seelman, 39426 Calistoga Dr., Murrieta, Calif. 92563

[73] Assignee: George Seelman, Murrieta, Calif.

[21] Appl. No.: 582,777

[22] Filed: Jan. 4, 1996

[51] Int. Cl.⁶ ............................................. B60R 25/10
[52] U.S. Cl. .......................... 340/426; 180/272; 180/286; 367/198; 381/86; 381/110; 395/2.84; 395/2.52
[58] Field of Search ........................ 340/426; 367/198; 381/110, 86; 395/2.84, 2.52; 180/272, 286

[56] References Cited

U.S. PATENT DOCUMENTS

| | | | |
|---|---|---|---|
| 4,137,985 | 2/1979 | Winchell | 180/286 |
| 4,232,289 | 11/1980 | Daniel | 180/272 |
| 4,401,852 | 8/1983 | Noso et al. | 367/198 |
| 4,450,545 | 5/1984 | Kishi et al. | 367/198 |
| 4,593,403 | 6/1986 | Kishi et al. | 381/110 |
| 4,797,924 | 1/1989 | Schnars et al. | 395/2.84 |
| 4,827,520 | 5/1989 | Zeinstra | 395/2.52 |
| 4,856,072 | 8/1989 | Schneider et al. | 381/86 |
| 5,394,135 | 2/1995 | Stadler | 340/426 |
| 5,397,925 | 3/1995 | Carlo et al. | 340/426 |

*Primary Examiner*—Jeffery A. Hofsass
*Assistant Examiner*—John Tweel, Jr.
*Attorney, Agent, or Firm*—John J. Posta, Jr.

[57] ABSTRACT

An improved vehicle security system is disclosed in which different modes of arming and disarming the system are utilized. The system uses an arming feature to disable operation of the vehicle which is initiated by the vehicle ignition switch being turned off following which one or more doors of the vehicle are opened. The system also uses a voice actuated alarm deactivation procedure in which operation of the vehicle is enabled following voice identification of a spoken password as belonging to an authorized individual. The vehicle security system uses a positive interlock in which both the vehicle's starting system and its ignition system are disabled when the system is armed.

24 Claims, 3 Drawing Sheets

VOICE ACTUATED VEHICLE SECURITY SYSTEM WITH STARTING SYSTEM INTERLOCK AND AUTOMATIC ARMING FEATURE

BACKGROUND OF THE INVENTION

Field of the Invention

The present invention relates generally to the field of vehicle security systems, and more particularly to an improved vehicle security system which combines: a. a passive arming feature which is initiated by the vehicle ignition being turned off following which one or more doors of the vehicle are opened; and b. a voice actuated alarm deactivation procedure whereby the vehicle's starter system is enabled following voice identification of a spoken password as belonging to an authorized individual.

The first theft of an motor vehicle no doubt followed only shortly after the initial invention of the horseless carriage, resulting in the initiation of a long series of devices and systems intended to prevent or at least discourage the theft of vehicle. Most such systems have consisted for some time of a lock mechanism which requires a key to unlock the mechanism. Modern vehicles have a single lock which serves both to lock the ignition switch and the steering column. Such locking systems can be quickly and easily disabled by both amateur and professional thieves.

The next step in vehicle security was the car alarm, which varies considerably in complexity from the simple electrical alarm systems to the more sophisticated electronic systems known today. While the early systems were easily defeated by thieves, the electronic systems in widespread use today have proven to be more difficult to defeat. Such systems typically use small radio frequency (RF) remote transmitters to send a coded signal to lock and unlock the vehicle alarm system.

This system has two weaknesses which have manifested themselves with the increasing frequency of cars thought to be protected by such security systems. First, sophisticated thieves have taken to using code scanning electronic monitoring devices to capture the coded signal transmitted by the remote transmitters. Then, by using the captured code, the vehicle security system may be easily defeated by merely turning it off with the intercepted code. Second, with the recent dramatic increase in carjacking, the thief takes the owner's keys and remote transmitter. Thus, even the most sophisticated vehicle security systems are ineffectual.

The present invention uses as its basis the voice of the vehicle's operator(s) as the "key" to unlock the security system. The art is not without numerous references which have found application for voice actuated systems of one kind or another. It is useful at this point to quickly review the voice recognition art to ascertain its applications of this interesting technology.

A variety of generic voice actuation systems are illustrated in U.S. Pat. No. 4,506,377, to Kishi et al., in U.S. Pat. No. 4,528,687, to Noso et al., in U.S. Pat. No. 4,538,295, to Noso et al., in U.S. Pat. No. 4,558,459, to Noso et al., in U.S. Pat. No. 5,593,403, to Kishi et al., and in U.S. Pat. No. 4,637,045, to Noso et al. All of these patents are assigned to Nissan Motor Company, and, although they do not teach vehicle security systems, serve as useful references for the application and implementation of voice actuation technology. Accordingly, U.S. Pat. No. 4,506,377, U.S. Pat. No. 4,528,687, U.S. Pat. No. 4,538,295, U.S. Pat. No. 4,558,459, U.S. Pat. No. 5,593,403, and U.S. Pat. No. 4,637,045 are each and all hereby incorporated herein by reference.

Five additional references teach specific applications for voice actuation technology. These references are U.S. Pat. No. 4,450,545, to Kishi et al., U.S. Pat. No. 4,501,012, to Kishi et al., U.S. Pat. No. 4,506,378, to Noso et al., U.S. Pat. No. 4,797,924, to Schnars et al., and U.S. Pat. No. 4,827,520, to Zeinstra. The '545 patent teaches a voice responsive door lock system. The '012 patent teaches a voice actuation system for actuating doors, a trunk lid, the hi/low beam selection, an air conditioner, or a radio.

The '378 patent teaches a voice operated system for stopping a moving device like a vehicle window. The '924 patent teaches a voice actuated system for operating a wide variety of controls in a vehicle. The '520 patent teaches a voice actuated system for operating a radio or a cellular phone. While none of these patents teach vehicle security systems, again they are useful references for the application and implementation of voice actuation technology. Accordingly, U.S. Pat. No. 4,450,545, U.S. Pat. No. 4,501,012, U.S. Pat. No. 4,506,378, U.S. Pat. No. 4,797,924, and U.S. Pat. No. 4,827,520 are each and all hereby incorporated herein by reference.

One additional reference is more on point. U.S. Pat. No. 4,856,072, to Schneider et al., indeed teaches a voice operated vehicle security system. The system of the '072 patent has internal and external microphones and speakers, and is quite sophisticated. In fact, the system of the '072 patent is so sophisticated that it requires voice actuation to activate the security system. This has proven to be less than completely desirable, since many times the operator of the vehicle will merely not take the time to arm the security system when active measures must be taken to do so. The unfortunate result is all too often a stolen vehicle with a very sophisticated security system which has not been turned on.

Another problem encountered with the system of the '072 patent is that it can only operate to disable the starter. Since the ignition switch can easily be bypassed (by the procedure known as "hot-wiring"), this offers little security against the professional thief, or even against the more sophisticated amateur thief. Accordingly, it will be appreciated by those skilled in the art that the system of the '072 patent, while innovative, does not offer a completely effective security solution. Nonetheless, U.S. Pat. No. 4,856,072 is hereby incorporated herein by reference.

It is accordingly the primary objective of the present invention that it provide a voice actuated vehicle security system which uses the voice of the vehicle's operator to thereby provide a secure "key" to unlock the security system, but that the system of the present invention do so in a manner which eliminates the disadvantages possessed by the system of the '072 reference. It is a related objective of the voice actuated vehicle security system of the present invention that it provide for passive arming of the security system without requiring a voice command or any other dedicated arming procedure to initiate operation of the security system. It is an additional related objective of the voice actuated vehicle security system of the present invention that it provide one or more positive interlocks which prevent the vehicle in which the voice actuated vehicle security system is installed from being easily stolen by bypassing a starter interlock (by "hot-wiring" or otherwise).

It is an additional objective of the voice actuated vehicle security system of the present invention that it be operable with any vehicle, so that it may be easily installed and operated on any of the wide variety of vehicles presently in use. It is yet another objective of the voice actuated vehicle security system of the present invention that it be operable with any of the additional customary vehicle security alarm features known, such as door, hood, and trunk switches, a shock sensor, and an RF remote transmitter to lock and unlock the doors. It is a further objective of the voice actuated vehicle security system of the present invention that in an additional aspect it provide a mechanism for starting the vehicle without the use of the ignition key, and that it be capable of unlocking the steering column without the use of the ignition key.

The voice actuated vehicle security system of the present invention must also be of construction which is both durable and long lasting, and it should also require little or no maintenance to be provided by the user throughout its operating lifetime. In order to enhance the market appeal of the voice actuated vehicle security system of the present invention, it should also be of inexpensive construction to thereby afford it the broadest possible market. Finally, it is also an objective that all of the aforesaid advantages and objectives of the voice actuated vehicle security system of the present invention be achieved without incurring any substantial relative disadvantage.

SUMMARY OF THE INVENTION

The disadvantages and limitations of the background art discussed above are overcome by the present invention. With this invention, a voice actuated vehicle security system is provided which possesses the unique combination of three elements not heretofore found in a single vehicle security system. First, and most essentially, the voice actuated vehicle security system of the present invention uses the vehicle operator's voice as the key to disarm the system. Second, it provides passive arming without requiring the performance of an affirmative act to arm the vehicle security system. Third, the voice actuated vehicle security system of the present invention provides one or more positive interlocks to prevent the vehicle from being started without the vehicle security system first being deactivated.

The voice actuated vehicle security system of the present invention provides a microphone inside the vehicle, which provides several advantages in and of itself. The ambient noise level inside the vehicle is generally much lower than outside the vehicle, and the voice actuation circuitry thus works better than systems using a microphone located on the outside of the vehicle. In addition, since the voice actuated vehicle security system of the present invention only uses the voice of the operator to disarm the system prior to starting the vehicle, only a single microphone inside the vehicle is necessary.

The system may be trained for one or more operators, as is conventional in the art (as demonstrated by the references incorporated by reference above). The voice actuated vehicle security system is passively armed by one or more inputs supplied from the vehicle itself. In the preferred embodiment, the system is armed when the ignition switch is turned off and one or more doors of the vehicle open (indicating that the occupants have left the vehicle). Note that if desired, only the driver's door could be used as the indication of egress from the vehicle. Thus, the system is armed automatically and passively, requiring neither a voice command nor any other affirmative act to arm the system.

This brings into play the positive interlock which will prevent the vehicle from being started. In the preferred embodiment, interlocks are placed both in the starter motor electrical path and in the ignition system electrical path. These interlocks may be relays, with a first relay being placed in the path between the ignition switch and the starter solenoid, and a second relay being placed in the path between the ignition switch and the coil (or the electronic ignition system if one is used). Thus, rather than merely placing an obstruction which can be defeated by "hot-wiring", the voice actuated vehicle security system of the present invention presents an enhanced dual interlock system.

In the preferred embodiment, the vehicle security system of the present invention uses an RF remote transmitter, which may be used to lock and unlock the doors of the vehicle. (Note also that the doors of the vehicle could also be locked automatically at the time the system is passively armed.) Upon returning to the vehicle, the operator opens the doors of the vehicle and gets inside the vehicle. Typically, the ignition key is inserted into the ignition switch. At this point, the vehicle security system will prompt the operator for the password, which must be delivered by an individual whose voice which has been trained into the system's memory. In the preferred embodiment, the vehicle security system uses voice synthesis to prompt the operator to speak the password.

In the preferred embodiment, the system has a siren alarm, which is sounded if an unauthorized intruder attempts to violate the vehicle. Switches in the doors, the hood, and/or the trunk may be used to initiate an alarm. Other sensors such as a shock sensor may also be used. An LED may also be installed to provide a visual alert that the vehicle is alarmed, as is conventional.

In an additional aspect of the present invention, if desired the vehicle security system may be set up to operate without the use of the ignition key. In this regard, by using the RF remote transmitter, the system may be initiated, and will request the password. If the password is entered correctly by an authorized operator, the vehicle will then be started. An interlock may be used to only allow the vehicle's engine to be started if the vehicle is in neutral or park, as is conventional. In another aspect which is related to the keyless start feature, an electromechanical steering column lock may be unlocked by the system at this point. These and other aspects of the present invention will become more apparent below following the detailed description of the preferred embodiment.

It may therefore be seen that the present invention teaches a voice actuated vehicle security system which uses the voice of the vehicle's operator as a secure "key" to unlock the security system, doing so in a manner which eliminates the disadvantages of previously known vehicle security systems. The voice actuated vehicle security system of the present invention thus provides for passive arming of the security system without requiring a voice command or any other dedicated arming procedure to initiate operation of the security system. It is also provides one or more positive interlocks which prevent the vehicle in which the voice actuated vehicle security system is installed from being easily stolen by bypassing a starter interlock (by "hot-wiring" or otherwise).

The voice actuated vehicle security system of the present invention is operable with any vehicle, so that it may be easily installed and operated on any of the wide variety of vehicles presently in use. It is also operable with any of the additional customary vehicle security alarm features known, such as door, hood, and trunk switches, a shock sensor, and an RF remote transmitter to lock and unlock the doors. In an additional aspect, the voice actuated vehicle security system of the present invention provides a mechanism for starting the vehicle without the use of the ignition key; in this regard, it is also capable of unlocking the steering column without the use of the ignition key.

The voice actuated vehicle security system of the present invention is of construction which is both durable and long lasting, and which requires little or no maintenance to be provided by the user throughout its operating lifetime. The voice actuated vehicle security system of the present invention is also of inexpensive construction to enhance its market appeal and thereby afford it the broadest possible market. Finally, all of the aforesaid advantages and objectives of the voice actuated vehicle security system of the present invention are achieved without incurring any substantial relative disadvantage.

DESCRIPTION OF THE DRAWINGS

These and other advantages of the present invention are best understood with reference to the drawings, in which.

DETAILED DESCRIPTION OF THE PREFERRED EMBODIMENT

The preferred embodiment of the present invention uses a voice actuated system which recognizes the voice of one or more operators for which it has been trained. The operation of such a system is well known in the art, particularly in the above-incorporated references which form a part of the disclosure of this specification. The three key aspects of the present invention are its combination of voice recognition to disarm the vehicle security system, the use of passive arming of the vehicle security system, and the positive interlock mechanism which prevents the vehicle from being started.

Figure 1:
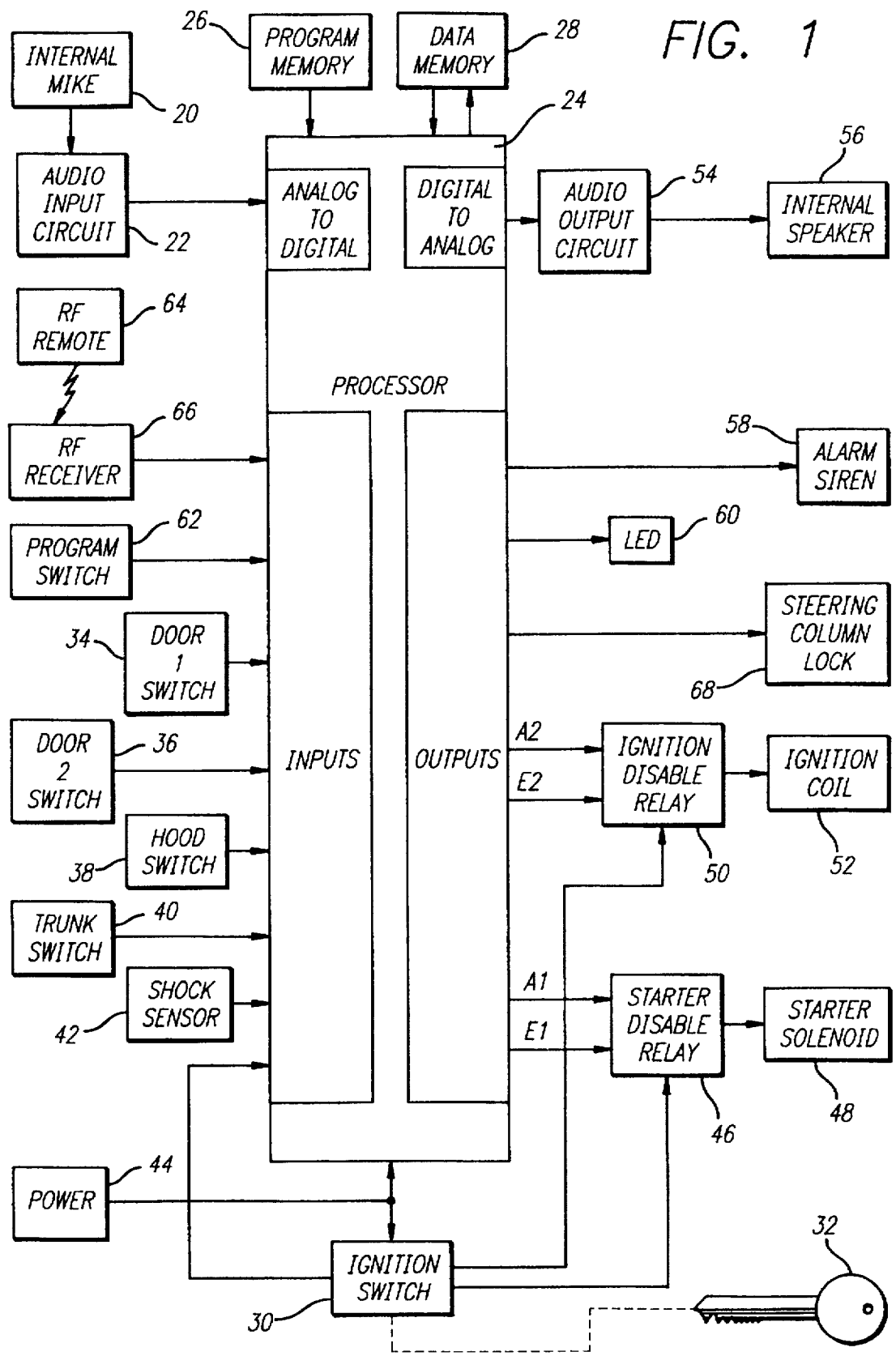
FIG. 1 is a functional schematic diagram of the voice actuated vehicle security system of the present invention showing the various components as well as additional components which may be used if so desired.

Referring now to FIG. 1, the preferred embodiment voice actuated vehicle security system of the present invention is illustrated. It will be apparent during the course of the following discussion that a number of embellishments not essential to the three key aspects of the present invention are illustrated in FIG. 1. An inside microphone 20 is provided for the operator to input spoken commands and/or passwords to the voice actuated vehicle security system of the present invention. It will be understood that the inside microphone 20 is for installation inside a vehicle, preferably near the driver's seat where it can be used by the operator of the vehicle.

The inside microphone 20 will transduce the spoken commands/password to an electrical signal, which is supplied from the inside microphone 20 to an audio input circuit 22. The audio input circuit 22 amplifies the electrical signals from the inside microphone 20, and may if desired apply filtering to the signals as well. Since speech recognition circuitry works best with normalized input levels, the audio input circuit 22 preferably includes an automatic gain control (AGC) circuit. The output of the audio input circuit 22 is supplied to a microcontroller 24, which is the heart of the voice actuated vehicle security system of the present invention.

The signal from the audio input circuit 22 is converted from an analog signal to a digital signal as soon as it enters the microcontroller 24. The microcontroller 24 operates as a digital signal processor to perform the speech recognition function in a manner which is well known to those skilled in the art (and which is taught in the above-incorporated by reference patents as well). The microcontroller 24 operates according to a program which is stored in a program memory 26, which is typically ROM. During operation of the microcontroller 24, program variables and speech templates are stored in a data memory 28, which is typically RAM.

In order to enable passive arming of the vehicle security system, an input from the vehicle is necessary. This input can be from one or more of a variety of inputs to the microcontroller 24, including an input from an ignition switch 30 which is operated by an ignition key 32, and inputs from a first door switch 34 and a second door switch 36. Additional inputs to the microcontroller 24 illustrated in FIG. 1 are inputs from a hood switch 38, a trunk switch 40, and a shock sensor 42. In the preferred embodiment, to arm the vehicle security system of the present invention, the ignition key 32 is turned to the off position in the ignition switch 30 (or alternately the ignition key 32 can be removed from the ignition switch 30), and one or more of the first door switch 34 and the second door switch 36 indicated the opening (and closing, if desired) of one or more vehicle doors. At this point, the microcontroller 24 will initiate a first timing period, and if no more activity occurs, the vehicle security system will be activated.

Note that a power source 44 (typically the vehicle's battery) supplies power to the microcontroller 24 and to the ignition switch 30. When the vehicle security system of the present invention is activated, it will provide a positive interlock disabling the vehicle from starting. In the preferred embodiment, this is accomplished in two ways. First, a starter disable relay 46 is located between the ignition switch 30 and a starter solenoid 48 of the vehicle. The starter disable relay 46 is a normally closed switch, which is opened by a signal from the microcontroller 24 on line E1 when the vehicle security system is actuated. When the starter disable relay 46 is opened, the starter solenoid 48 will not operate, meaning that the starter motor (not shown) will not operate to start the vehicle.

The second interlock is provided by an ignition disable relay 50, which is located between the ignition switch 30 and an ignition coil 52 of the vehicle. The ignition disable relay 50 is a normally closed switch, which also is opened by a signal from the microcontroller 24 on line E2 when the vehicle security system is actuated. When the ignition disable relay 50 is opened, the ignition coil 52 will not operate, meaning that the ignition system of the vehicle will not operate, thereby preventing the vehicle from starting.

The microcontroller 24 also includes a digital to analog converter, from which comes a signal which is supplied to an audio output circuit 54, which drives an internal speaker 56. The internal speaker 56 is for location inside the vehicle, to produce a synthesized voice directing the operator of the vehicle security system. The microcontroller 24 also drives an alarm siren 58, which is used to provide an alarm signal when the vehicle integrity has been violated. Note that the microcontroller 24 could also drive the lights of the vehicle to flash, is desired.

An LED 60 is also drive by the microcontroller 24, and will be illuminated whenever the vehicle security system is actuated. A program switch 62 is used to provide operator input into the system, to initiate operations, or to program the microcontroller 24. In the preferred embodiment, a RF remote transmitter 64 is used with the vehicle security system. The RF remote transmitter 64 generates a signal, which is received by a RF receiver 66, which then supplies a signal to the microcontroller 24. The RF remote transmitter 64 may be used to lock or unlock the doors of the vehicle.

In an additional aspect, the voice actuated vehicle security system of the present invention may also be used to disarm the vehicle and start the engine without the use of the ignition key 32. The RF remote transmitter 64 may be used to initiate this operation, and following acceptance of a password the microcontroller 24 will supply additional signals on lines A1 and A2 to the starter disable relay 46 and the ignition disable relay 50, respectively, causing them to operate the starter solenoid 48 and the ignition coil 52, respectively. In an additional aspect, an electromechanical steering column lock 68 may be actuated by the microcontroller 24 to lock and unlock the steering column (not shown) of the vehicle instead of the conventional steering column lock which is actuated by the ignition key 32 in the ignition switch 30.

Figures 1, 2:
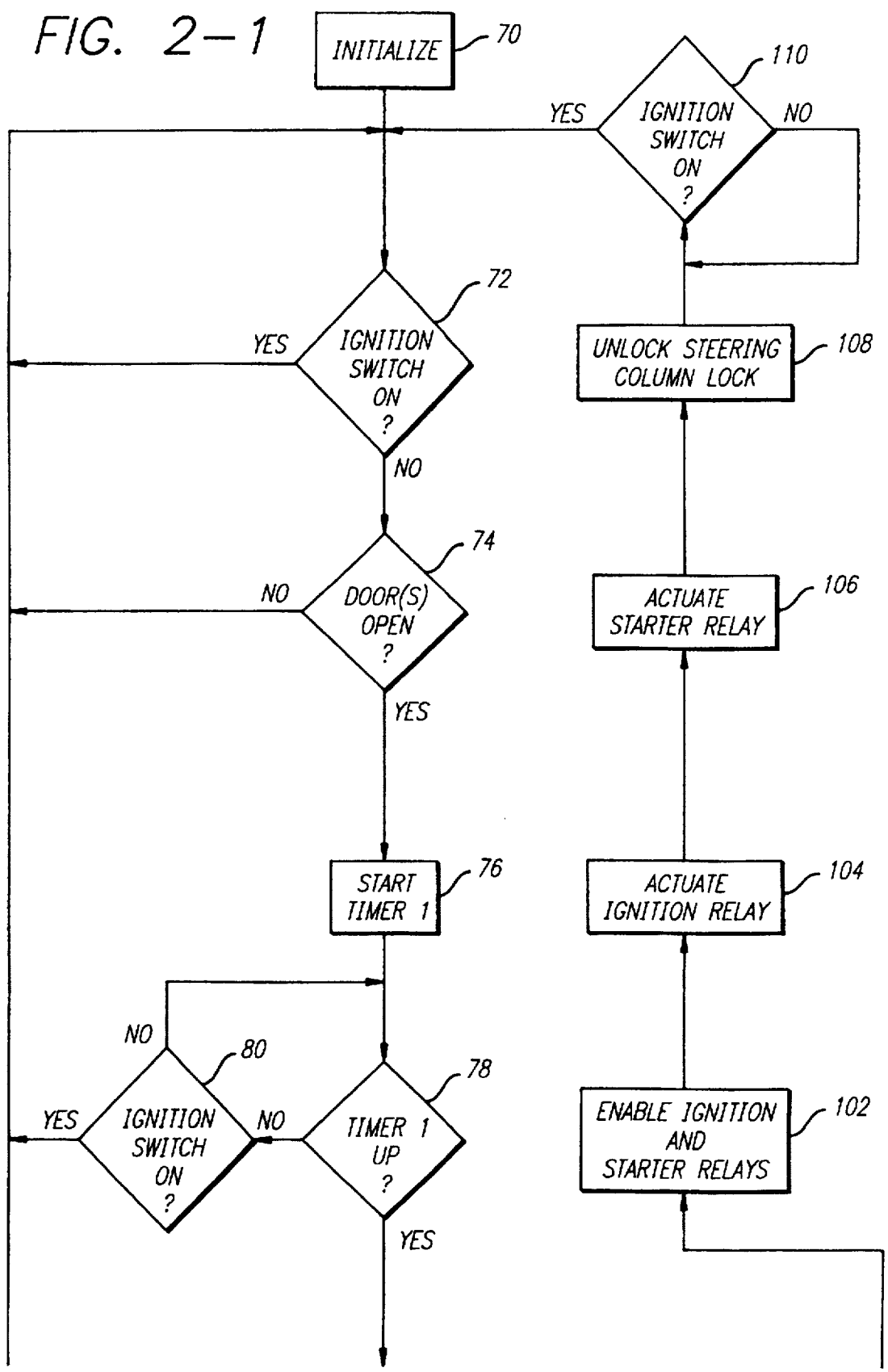
FIG. 2 is a flow chart showing one possible mode of operation for the voice actuated vehicle security system illustrated in FIG. 1.
Figure 2:
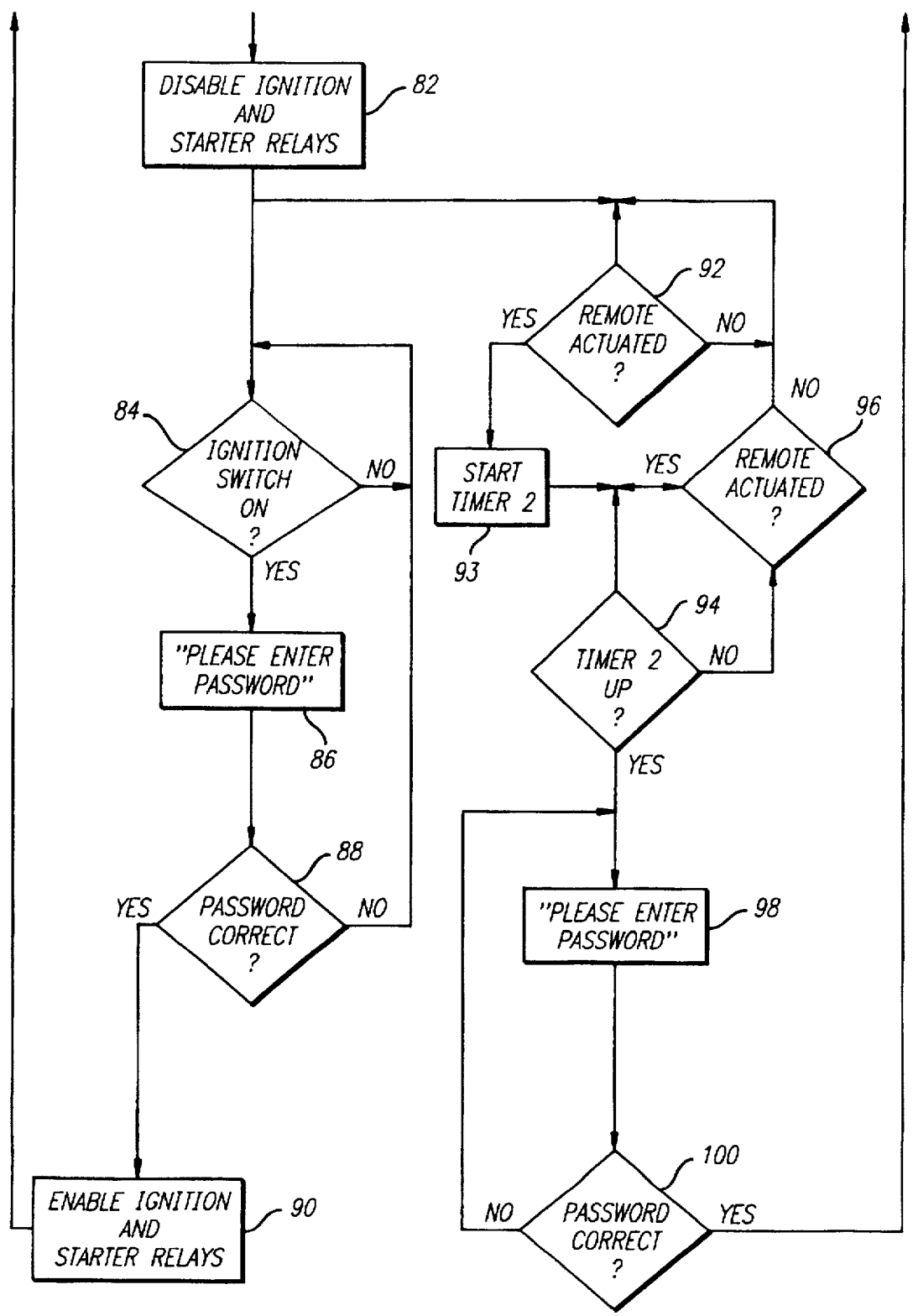

Referring next to FIG. 2, the basic operation of the voice actuated vehicle security system of the present invention may be described briefly. When the system is first powered following installation, it will start from initialization position 70, which is an initialization routine. Following initialization, the vehicle will be enabled, with the vehicle security system not inhibiting operation. The next operation is decision position 72, where the system determines whether the ignition switch 30 (FIG. 1) is on or not. If the ignition switch 30 is on, the system will loop back to the decision position 72 again.

If the ignition switch 30 is off, the system will move to the decision position 74, where the system determines whether the door or doors being monitored are open. If the door(s) are not open, then the system will look back to the decision position 72. If the door(s) are open, then the system will move to the position 76, where a first timer is started. The system then moves to the decision position 78, where it is determined whether the first timer has timed out. If the first timer has not timed out, the system will move to the decision position 80, where the system determines whether the ignition switch 30 is still off. If the ignition switch 30 is still off, the system will move back to the decision position 78. If the ignition switch 30 is now on, the system will move back to the decision position 72.

If the first timer has timed out, the system will move to the position 82, where the starter disable relay 46 and the ignition disable relay 50 are disabled, inhibiting operation of the starter solenoid 48 and the ignition coil 52 (all shown in FIG. 1).

From the position 82, the system moves to the decision position 84, where the system determines whether the ignition switch 30 is on. If the ignition switch 30 is not turned on, then the system loops back to the decision position 84. If the ignition switch 30 is on, then the system moves to the position 86, where the vehicle security system prompts the operator for the password, and then moves to the decision position 88. If the password provided by the operator does not match an approved speech pattern, then the system loops back to the decision position 84.

If the password provided by the operator matches an approved speech pattern, then the system moves to the position 90, where the starter disable relay 46 and the ignition disable relay 50 are enabled, allowing operation of the starter solenoid 48 and the ignition coil 52 (all shown in FIG. 1). The system then loops back to the decision position 72.

If the voice actuated vehicle security system of the present invention is set up to allow the operation of the vehicle without the ignition key 32, the following operations would occur. From the position 82, the system would move to the decision position 92, where it is determined whether the RF remote transmitter 64 (FIG. 1) is being actuated. If the RF remote transmitter 64 is not being actuated, the system will loop back to the decision position 92.

If the RF remote transmitter 64 is being actuated, the system will move to the position 93, where a second timer is started. The system then moves to the decision position 94, where it is determined whether the second timer has timed out. If the second timer has not timed out, the system will move to the decision position 96, where the system determines whether the RF remote transmitter 64 is still being actuated. If the RF remote transmitter 64 is still being actuated, the system will move back to the decision position 94. If the RF remote transmitter 64 is no longer being actuated, the system will move back to the decision position 92.

If the second timer has timed out, the system will move to the position 98, where the vehicle security system prompts the operator for the password, and then moves to the decision position 100. If the password provided by the operator does not match an approved speech pattern, then the system loops back to the decision position 98.

If the password provided by the operator matches an approved speech pattern, then the system moves to the position 102, where the starter disable relay 46 and the ignition disable relay 50 are enabled, allowing operation of the starter solenoid 48 and the ignition coil 52 (all shown in FIG. 1). The system then moves to the position 104, where the ignition disable relay 50 is actuated by the microcontroller 24 (FIG. 1). The system then moves to the position 106, where the starter disable relay 46 is actuated by the microcontroller 24. The system then moves to the position 108, where the steering column lock 68 (FIG. 1) is unlocked by the microcontroller 24.

The system then moves to the decision position 110, where the system determines whether the ignition switch 30 (FIG. 1) is on. If the ignition switch 30 is not turned on, then the system loops back to the decision position 110. If the ignition switch 30 is on, then the system moves to the decision position 72.

It may therefore be appreciated from the above detailed description of the preferred embodiment of the present invention that it teaches a voice actuated vehicle security system which uses the voice of the vehicle's operator as a secure "key" to unlock the security system, doing so in a manner which eliminates the disadvantages of previously known vehicle security systems. The voice actuated vehicle security system of the present invention thus provides for passive arming of the security system without requiring a voice command or any other dedicated arming procedure to initiate operation of the security system. It is also provides one or more positive interlocks which prevent the vehicle in which the voice actuated vehicle security system is installed from being easily stolen by bypassing a starter interlock (by "hot-wiring" or otherwise).

The voice actuated vehicle security system of the present invention is operable with any vehicle, so that it may be easily installed and operated on any of the wide variety of vehicles presently in use. It is also operable with any of the additional customary vehicle security alarm features known, such as door, hood, and trunk switches, a shock sensor, and an RF remote transmitter to lock and unlock the doors. In an additional aspect, the voice actuated vehicle security system of the present invention provides a mechanism for starting the vehicle without the use of the ignition key; in this regard, it is also capable of unlocking the steering column without the use of the ignition key.

The voice actuated vehicle security system of the present invention is of construction which is both durable and long lasting, and which requires little or no maintenance to be provided by the user throughout its operating lifetime. The voice actuated vehicle security system of the present invention is also of inexpensive construction to enhance its market appeal and thereby afford it the broadest possible market. Finally, all of the aforesaid advantages and objectives of the voice actuated vehicle security system of the present invention are achieved without incurring any substantial relative disadvantage.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

It should also be noted that appropriate software and hardware could be included in the security system so that one can determine all operators of the system, including time of operation.

Furthermore, additional software and hardware can be incorporated into the security system so that by voice command a present and past status report through voice synthesis can be obtained, including time of intrusion, zone of intrusion, etc.

What is claimed is:

1. A voice actuated vehicle security system, comprising:

a microphone for transducing spoken expressions into electronic signals corresponding to said spoken expressions, said microphone being adapted for mounting inside a vehicle;

an audio input circuit for conditioning said electronic signals from said microphone;

a memory storage for storing speech templates;

means for selectively generating an input signal for use to passively arm said vehicle security system, the generation of said input signal being indicative of at least one predetermined condition associated with the vehicle;

a processor for processing said conditioned electronic signals and for comparing the processed, conditioned electronic signals with said speech templates stored in said memory storage, said processor generating a disarming signal when said processed, conditioned electronic signals are substantially similar to one of said speech templates, said processor monitoring said input signal and producing an arming signal when said input signal indicates the presence of said at least one predetermined condition; and an electrical interlock mechanism operated by said processor, said electrical interlock mechanism for placement in series with the ignition system of the vehicle to positively inhibit the engine of the vehicle from running by preventing the spark-generating ignition system of the vehicle from operating when said processor produces said arming signal, said electrical interlock mechanism allowing the vehicle to be started when said processor produces said disarming signal.

2. A voice actuated vehicle security system as defined in claim 1, wherein said audio input circuit comprises:

means for selectively adjusting the gain of said electronic signals from said microphone to vary the level of said electronic signals.

3. A voice actuated vehicle security system as defined in claim 2, wherein said means for selectively adjusting comprises:

an automatic gain control (AGC) circuit.

4. A voice actuated vehicle security system as defined in claim 1, additionally comprising:

means for selectively storing processed, conditioned electronic signals as speech templates in said memory storage.

5. A voice actuated vehicle security system as defined in claim 1, wherein said means for selectively generating an input signal comprises:

an ignition switch associated with the vehicle, said ignition switch having an on position and an off position.

6. A voice actuated vehicle security system as defined in claim 5, wherein said at least one predetermined condition is said ignition switch being in said off position.

7. A voice actuated vehicle security system as defined in claim 5, wherein said means for selectively generating an input signal additionally comprises:

a door switch indicating the position of a door in said vehicle, said door switch having a first position indicating that the door is closed and a second position indicating that the door is open.

8. A voice actuated vehicle security system as defined in claim 7, wherein said at least one predetermined condition is said door switch going from said second position to said first position with said ignition switch being in said off position.

9. A voice actuated vehicle security system as defined in claim 1, additionally comprising:

means for passively initiating the arming of said vehicle security system to generate said input signal upon at least one of the detected events from the group consisting of: a. an ignition key for the vehicle being turned off; and: b. a door of the vehicle being sequentially opened and then closed.

10. A voice actuated vehicle security system as defined. in claim 1, wherein said means for selectively generating an input signal comprises:

a door switch indicating the position of a door in said vehicle, said door switch having a first position indicating that the door is closed and a second position indicating that the door is open.

11. A voice actuated vehicle security system as defined in claim 10, wherein said at least one predetermined condition is said door switch being in said second position.

12. A voice actuated vehicle security system as defined in claim 1, wherein said processor processes said conditioned electronic signals by converting them from analog signals to digital signals.

13. A voice actuated vehicle security system as defined in claim 1, wherein said processor comprises:

a digital signal processor.

14. A voice actuated vehicle security system as defined in claim 1, additionally comprising:

a starter disable relay for enabling the operation of a starter associated with the vehicle when said processor produces said disarming signal and disabling the operation of the starter when said processor produces said arming signal.

15. A voice actuated vehicle security system as defined in claim 1, wherein said electrical interlock mechanism comprises:
   an ignition disable relay for enabling the operation of the ignition system of the vehicle when said processor produces said disarming signal and disabling the operation of the ignition system when said processor produces said arming signal.

16. A voice actuated vehicle security system as defined in claim 1, wherein the vehicle has an ignition switch operated by an ignition key, said voice actuated vehicle security system additionally comprising:
   means for starting the vehicle without the use of the ignition key in the ignition switch.

17. A voice actuated vehicle security system as defined in claim 16, additionally comprising:
   a steering column lock, said steering column lock having a locked position and an unlocked position, said steering column lock being operated by said processor, said steering column lock being in said locked position when said processor produces said arming signal, said steering column lock being in said unlocked position when said processor produces said disarming signal.

18. A voice actuated vehicle security system as defined in claim 1, additionally comprising:
   speech synthesis means driven by said processor for generating vocal messages to direct the interaction of an individual with said voice actuated vehicle security system.

19. A voice actuated vehicle security system as defined in claim 1, additionally comprising:
   means for generating an alarm to indicate a violation of said voice actuated vehicle security system.

20. A voice actuated vehicle security system as defined in claim 1, additionally comprising:
   a radio frequency (RF) remote transmitter for generating a signal; and
   a RF receiver for receiving a signal generated by said RF remote transmitter, said RF receiver being operatively connected to said processor.

21. A voice actuated vehicle security system, comprising:
   a microphone for transducing spoken expressions into electronic signals corresponding to said spoken expressions;
   means for conditioning said electronic signals from said microphone;
   means for storing speech templates;
   means for selectively generating an input signal for use to passively arm said vehicle security system, the generation of said input signal being indicative of at least one predetermined condition associated with the vehicle;
   a processor for comparing the conditioned electronic signals with said speech templates, said processor generating a disarming signal when said conditioned electronic signals are substantially similar to one of said speech templates, said processor monitoring said input signal and producing an arming signal when said input signal is present; and
   an electrical interlock mechanism for placement in series with the ignition system of the vehicle to inhibit the engine of the vehicle from running by preventing the spark-generating ignition system of the vehicle from operating when said processor produces said arming signal and allowing the vehicle to be started when said processor produces said disarming signal.

22. A method of operating a voice actuated vehicle security system, comprising:
   transducing spoken expressions into electronic signals corresponding to said spoken expressions with a microphone, said microphone being adapted for mounting inside a vehicle;
   conditioning said electronic signals from said microphone with an audio input circuit;
   storing speech templates in a memory storage;
   selectively generating an input signal for use to passively arm said vehicle security system, the generation of said input signal being indicative of at least one predetermined condition associated with the vehicle;
   processing said conditioned electronic signals with a processor and comparing the processed, conditioned electronic signals with said speech templates stored in said memory storage;
   generating a disarming signal when said processed, conditioned electronic signals are substantially similar to one of said speech templates;
   monitoring said input signal and producing an arming signal when said input signal indicates the presence of said at least one predetermined condition; and
   positively inhibiting the engine of the vehicle from running by preventing the spark-generating ignition system of the vehicle from operating when said arming signal is produced, and allowing the vehicle to be started when said disarming signal is produced.

23. A voice actuated vehicle security system, comprising:
   a microphone for transducing spoken expressions into electronic signals corresponding to said spoken expressions, said microphone being adapted for mounting inside a vehicle;
   an audio input circuit for conditioning said electronic signals from said microphone;
   a memory storage for storing speech templates;
   passively arming apparatus for generating an input signal for use to passively arm said vehicle security system upon the occurrence of at least one predetermined condition associated with the vehicle;
   a processor for processing said conditioned electronic signals and for comparing the processed, conditioned electronic signals with said speech templates stored in said memory storage, said processor generating a disarming signal when said processed, conditioned electronic signals are substantially similar to one of said speech templates, said processor monitoring said input signal and producing an arming signal when said input signal indicates the presence of said at least one predetermined condition; and
   an electrical interlock mechanism operated by said processor, said electrical interlock mechanism for placement in series with the ignition system of the vehicle to positively inhibit the engine of the vehicle from either being started (by disabling the starter of the vehicle) or running (by preventing the spark-generating ignition system of the vehicle from operating) when said processor produces said arming signal, said electrical interlock mechanism allowing the vehicle to be both started and operated when said processor produces said disarming signal.

24. A voice actuated vehicle security system, comprising:
   a microphone for transducing spoken expressions into electronic signals corresponding to said spoken expressions, said microphone being adapted for mounting inside a vehicle;

an audio input circuit for conditioning said electronic signals from said microphone;

a memory storage for storing speech templates;

means for selectively generating an input signal for use to passively arm said vehicle security system, the generation of said input signal being indicative of at least one predetermined condition associated with the vehicle, said means for selectively generating an input signal comprising:

an ignition switch associated with the vehicle, said ignition switch having an on position and an off position;

a door switch indicating the position of a door in said vehicle, said door switch having a first position indicating that the door is closed and a second position indicating that the door is open, said at least one predetermined condition associated with the vehicle comprising said door switch going from said second position to said first position with said ignition switch being in said off position;

a processor for processing said conditioned electronic signals and for comparing the processed, conditioned electronic signals with said speech templates stored in said memory storage, said processor generating a disarming signal when said processed, conditioned electronic signals are substantially similar to one of said speech templates, said processor monitoring said input signal and producing an arming signal when said input signal indicates the presence of said at least one predetermined condition; and an interlock mechanism operated by said processor, said interlock mechanism positively inhibiting the vehicle from being started when said processor produces said arming signal, said interlock mechanism allowing the vehicle to be started when said processor produces said disarming signal.

\* \* \* \* \*